Inventors
FRITZ GERMANN
MANFRED GROTE

By Toulmin & Toulmin
Attorneys

June 27, 1967  F. GERMANN ETAL  3,328,596
D.C.-A.C. CONVERTER FOR PRODUCING HIGH FREQUENCY OUTPUTS
Filed July 3, 1963  2 Sheets-Sheet 2

INVENTORS
Fritz Germann &
Manfred Grote

BY Spencer & Kaye
ATTORNEYS

United States Patent Office 3,328,596
Patented June 27, 1967

3,328,596
D.C.-A.C. CONVERTER FOR PRODUCING HIGH FREQUENCY OUTPUTS
Fritz Germann, Ruthen, and Manfred Grote, Belecke, Germany, assignors to Licentia Patent-Verwaltungs-G.m.b.H., Frankfurt am Main, Germany
Filed July 3, 1963, Ser. No. 292,708
Claims priority, application Germany, July 4, 1962, L 42,387
5 Claims. (Cl. 307—12)

The present invention relates to the art of D.C.-A.C. conversion.

It is often required to have A.C. voltages available having a frequency well above the conventional 50 or 60 c.p.s. It is conventional to employ frequency multiplication circuit networks to produce such higher frequencies. However, a sufficiently high power output is available only with the aid of quite expensive circuitry. Electric D.C.-A.C. converters are better than multipliers, but also better than machine type converters because electrical circuitry producing D.C.-A.C. conversion usually operates without mechanical contacts, though contact type converters have been developed and used. The known converters using controllable rectifier elements have yet not been able to produce satisfactory results in case of output frequencies and currents sufficiently high so as to be usable, for example, for inductive heating.

It is an object of the present invention to provide for a new and improved D.C.-A.C. converter. It is another object of the present invention to provide for improvements in the art of A.C.-D.C.-A.C. conversion.

According to one aspect of the present invention in a preferred embodiment thereof it is suggested to provide a bridge circuit having four bridge branches, each branch including at least one controllable semiconductor rectifier, for example, a silicon controlled rectifier. The bridge circuit defines a pair of D.C. input terminals and a pair of A.C. output terminals. An inductance is used to connect the D.C. input terminals to a D.C. voltage source. The latter source may be a rectifier in case A.C.-D.C.-A.C. conversion is to be provided for.

A resonance circuit which includes the load reactance is connected to the A.C. output terminals of the bridge circuit. In other words, for a given load, the ohmic and the non-ohmic component is determined, and by way of an additional reactance (inductance or capacitance as required) the load circuit is completed so that the non-ohmic load component plus the additional reactance form a resonance circuit; the resonance frequency is to be below the desired A.C. output frequency as ultimately applied to the load. The semiconductor rectifier elements are controlled by a source producing control pulses at a rate frequency twice that of the desired A.C. output frequency; thus, this pulse rate frequency is more than twice the resonance frequency of the above mentioned resonance circuit of the load. How much the pulse rate frequency has to exceed twice this resonance frequency will be more fully explained below.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

Figure 1:
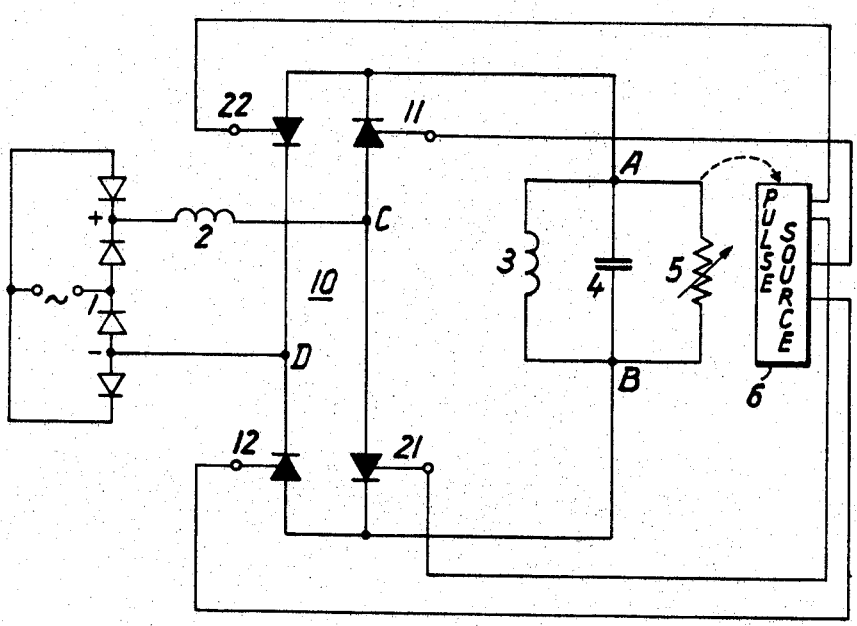
FIGURE 1 illustrates a network diagram of an improved A.C.-D.C.-A.C. converter including an embodiment of the novel D.C.-A.C. converter.

Proceeding now to the detailed description of the drawings, in FIGURE 1 thereof there is shown a D.C. voltage source which may be either a battery or, as shown specifically here, a rectifier 1 connected to the mains. A controllable rectifier assembly 10 comprised of four controllable semiconductor rectifier elements 11, 12, 21 and 22 is connected in bridge circuit configuration having A.C. output terminals A and B, and D.C. input terminals C and D so as to constitute a D.C.-A.C. converter. Elements 11, 12, 21 and 22 may be silicon controlled rectifier elements. A control or gating pulse source 6 delivers current pulses of short duration and of sufficient height to the elements 11, 12, 21 and 22.

A choke or inductance 2 is connected in series between terminal C and one pole, here the plus pole, of D.C. voltage source 1. The voltage drop between D.C. input and A.C. output is developed across this choke 2.

The assembly 10 has two A.C. output terminals A and B as stated to which is connected a resonance circuit, such as a tank circuit, comprised of an inductance 3 and a capacitance 4 connected in parallel thereto. An adjustable ohmic resistor 5 may be connected in parallel to this tank circuit and also between terminals A and B.

Since the converter output voltage and frequency appears across terminals A and B the pulse source 6 is preferably linked thereto to operate in synchronism with said output frequency.

Each circuit element of the oscillator circuit may constitute the actual load, but the load may also be a combination of such circuits elements or a portion thereof. The controllable semiconductor rectifier elements 11, 12, 21 and 22 are known per se, and it is also known that these elements have characteristics similar to that of a thyratron.

A silicon controlled rectifier is of the four layer type having three distinct p-n junctions. The rectifier is rendered conductive whenever the voltage applied to the end terminals thereof and in forward direction of the two outer junctions exceeds the breakdown voltage as primarily determined by the innermost and reversely directed p-n junction. This innermost p-n junction, however, may also be biased in its forward direction by a sufficiently large current pulse delivered thereto by a gate terminal at one of the inner layers. When this happens, current will flow in forward direction between the end electrodes even if the voltage applied thereto is below breakdown voltage.

Once current flow has started across the end terminals of such rectifier elements and has exceeded the current value corresponding to the breakdown voltage, current flow will continue indeed even if the voltage drop across the end terminals remains below the breakdown voltage and even if the current pulse at the gate terminal has disappeared. Current flow will continue as long as the voltage across the end terminals is above the knee or sluice voltage, which is, of course, much below the breakdown voltage.

Since similar function is present, analogous terminology to thyratron operation is proper and commonly employed; the current pulse applied to the gate terminal of the controlled semiconductor rectifier indeed "fires" it, i.e., it not only renders the rectifier conductive during the application of the pulse, but conduction continues as long as there is a driving voltage across the cathode and anode constituted by the end terminals. For converter operation, the elements are fired in pairs (11, 12–21, 22) and in synchronism so that the oscillator circuit is placed into the load circuit; blocking of the semiconductor rectifier elements occurs in an analogous manner.

Each controllable rectifier element will be rendered conductive only if (1) there is a minimum voltage equal to the sluice or knee voltage being applied in forward direction at its main or end electrodes and (2) there is a control current signal present at its control or gating electrode, assuming that the operational voltage is below the breakdown voltage. The minimum voltage value to be applied in forward direction at the main electrodes for firing the rectifier is determined by the voltage drop across a semiconductor rectifier element when being rendered conductive, the knee or sluice voltage thereof.

The tank circuit defines and determines the shape and time-dependent magnitude of the voltage across terminals A and B. This voltage further determines when in effect any semiconductor rectifier element having forward voltage applied to its main or end electrodes can be fired or can be blocked.

Before describing the converter operation in detail and before discussing the general conditions of operation, certain aspects with regard to individual semiconductor rectifier operation as well as terminology will be discussed first.

D.C. to A.C. conversion requires commutation of the electric current from a conductive semiconductor element over to a nonconductive element. In the present case, and using a bridge type rectifier assembly, such commutation actually occurs simultaneously for pairs of elements. Current commutation is possible only if the voltage applied to the respectively nonconductive element or elements at commencement of commutation is effective at its main electrodes in forward direction and has a magnitude equal to or above the sluice or knee voltage as stated above. Consequently, any presently conductive semiconductor element can be blocked or cut off only by way of current commutation during that period of time during which the oscillator or resonance circuit delivers a voltage in effect opposing the voltage derived from the D.C. voltage source but still having a magnitude sufficiently above hte sluice voltage of the rectifier element to be fired.

Figure 2:
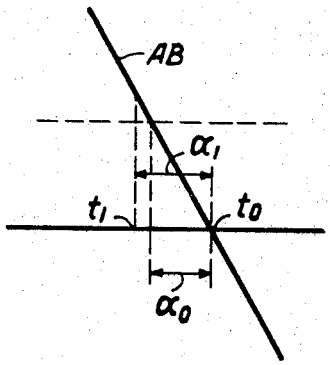
FIGURE 2 illustrates a voltage-time diagram around the oscillatory passage through zero of the voltage at the A.C. output terminals of the converter shown in FIGURE 1.

Turning now for a moment to FIGURE 2, there is shown a curve illustrative of the following situation: Assuming that elements 11 and 12 are momentarily conductive and assuming first that no current commutation is present, then the voltage across terminals A and B is an oscillating one and has at the end of one half cycle a sloping configuration as shown as curve AB in FIGURE 2.

Without current commutation, this voltage across terminals A and B would oscillatorily pass through zero at $t_0$. However, in order to attain current commutation at all, the existing voltage for, for example, semiconductor rectifier element 22, must be directed so that terminal A is still positive relative to terminal B. Otherwise, semiconductor rectifier element 22 could not be fired at all. Particularly after a voltage reversal at terminals A and B, no firing of elements 21 and 22 is possible.

The voltage across the end electrodes of semiconductor rectifier 22 is that between terminals A and D, which is composed of the momentarily effective voltage between terminals A and B and the voltage drop in conductive rectifier element 12, which is about the sluice voltage. In FIGURE 2 now, $\alpha_0$ denotes (measured in electric degrees for the cycle of the reasonance circuit) the angle measured from the zero passage at curve AB (time $t_0$) back to a point at which rectifier elements 21 and 22 could still be fired. Thus, current commutation must occur at a firing angle $\alpha_1$ such, as for example, representing a time $t_1$ prior to that of angle $\alpha_0$ to ensure due commutation.

$\alpha_0$ is the critical angle in electrical degrees measured from the passage through zero ($t_0$) of the oscillator voltage back to the time at which the cut off of the respectively conductive semiconductor element must occur at the latest, so that cut off will occur and the current will, in fact, commutate for proper D.C.-A.C. conversion.

The sluice voltage of the semiconductor rectifier elements determines only one portion of phase shift $\alpha_0$, other influencing factors will be determined as follows. At higher frequencies there is an inherent delay between the occurrence of a firing pulse for a nonconductive semiconductor element and actual extinction of conduction of the previously conductive semiconductor element, since at higher oscillator frequencies the minimum angle at which the voltage passes through the corresponding critical voltage for firing is negligibly small.

During current commutation the various electric currents and current components in the circuit network cannot be altered stepwise due to network reactances. Furthermore, the inherent cut off-delay time is a characteristic feature of semiconductor rectifier elements determined by physical properties thereof and is determined by the minimum period of time required to eliminate free charge carriers in the previously conductive element to really terminate conduction therein and to produce cut off thereof. Elimination of charge carriers is had by recombination or discharge (outflow) and must be complete to such an extent that no reversion to conduction occurs unless a succeeding control pulse is delivered. Hence, at high operating frequencies the required minimum firing angle $\alpha_0$ is not determined by minimum voltage requirements as between terminals A and D (or B and C) as defined above, but by the fact that from the moment of firing one element for cut off of the yet conductive rectifier element, the current cut off in the latter must occur still faster than the natural sloping through zero of the voltage AB as shown in FIGURE 2.

In summary, commutation of current must be initiated by firing the nonconductive semiconductor element at an angle $\alpha_1 > \alpha_0$ measured from the time of oscillatory passage through zero of the voltage across the output terminals (A and B) which minimum angle $\alpha_0$ is determined by either one or both of two conditions: One is that the downwardly sloping oscillatory voltage must not go below a value at which no firing of the nonconductive semiconductor element is possible anymore ($\alpha_{01}$). The other condition is that the current extinction in the element from which current is commutated away, must not occur at a rate slower than the rate of voltage decline for reversion at the output terminals by pure oscillator action ($\alpha_{02}$). The effective $\alpha_0$ then is the respective largest value of $\alpha_{01}$ and $\alpha_{02}$.

Now the complete converter operation will be described next, but only stationary converter operation is to be considered.

Assuming that semiconductor rectifier elements 11 and 12 have been rendered conductive, then the positive potential of source 1 as effective at terminal C is applied to terminal A, whereas the corresponding negative potential from terminal D is being applied to terminal B.

At a particular moment $t_1$, semiconductor rectifiers 21 and 22 are fired. This is possible, as long as terminal A is still sufficiently positive relative to B. However, upon firing of element 21 terminal C will temporarily assume the negative potential of terminal B, whereas upon concurrent firing of element 22 terminal D will temporarily assume the yet positive potential of terminal A. In both instances and by concurrent action rectifier cells 11 and 12 will thus be driven to cut off, provided the potential difference between terminals A and B is larger than the voltage drop across elements 21 and 22 when conductive.

Thereafter, the voltage between A and B decreases to zero, not along oscillatory curve AB of FIGURE 2 but by forced current commutation as determined by the cut off delay outlined above. This passage through zero will thus occur at any time between $t_1$ and $t_0$. The voltage across A, B reverses and swings again by oscillator resonance action towards another maximum of opposite polarity.

At time $t_2$ a synchronous control pulse will fire again semiconductor rectifier elements 11 and 12 and now the corresponding cut off of rectifier elements 21 and 22 occurs.

Of course, the specific location of the firing piont ($\alpha_1$) within a half wave period of the resonance frequency oscillation of the resonance circuit determines the output voltage.

A phase shift of the firing pulses correspondingly serves as A.C. output voltage control.

The firing time $t_1$ ($t_2$) can be altered either by such phase shift, or by an increase in firing pulse frequency, since in either case firing is had more or less prior to the natural passage through zero of the resonance voltage of the tank circuit.

Having explained the operation of the inventive inverter it now shall be explained to what extent there is a relationship between the resonance frequency of the tank circuit and the frequency of the pulse rate with which the firing pulses are being applied to the semiconductor rectifier elements.

Looking at the moment of passage through zero of the voltage between terminals A and B by way of forced commutation which occurs between $t_1$ and $t_0$, its next passage through zero if there were no next commutation occurs at a time interval about equal to half the oscillation period of the tank circuit. It was also explained above, however, that proper commutation can be had only if enforced by firing of the yet not conductive elements sufficiently prior to the oscillatory passage through zero. This firing sufficiently in advance of the natural swing through zero was expressed by the angle $\alpha_0$ as limit.

If T is the oscillation period of the tank circuit, the time interval $\tau$ in between two firing pulses delivered to rectifier assembly 10 is thus determined by the equation (1) $$\tau = \frac{T}{2} - (t_0 - t_1) = \frac{T}{2}\left(1 - \frac{\alpha_1}{\pi}\right)$$

so that the pulse rate frequency is given by (2) $$f_1 = \frac{2}{T \cdot \left(1 - \frac{\alpha_1}{\pi}\right)}$$

$f_0$ is the tank circuit resonance frequency; the firing pulse rate frequency is then given by $$f_1 = \frac{2f_0}{1 - \frac{\alpha_1}{\pi}}$$

since $\alpha_1$ cannot be smaller than $\alpha_0$, the smallest pulse rate frequency permissible is thus given by:

(3) $$f_1(\alpha_0) \geq \frac{2f_0}{1 - \frac{\alpha_0}{\pi}}$$

The second factor of Equation 3 is larger than unity and thus determines to what extent the firing pulse rate frequency must be at least more than twice the tank circuit resonance frequency. This frequency as determined by Equation 3 is the lower limit for the firing pulse rate frequency at a given resonance circuit connected across terminals A and B.

In other words, the requirement that the firing pulse rate frequency be more than twice the resonance frequency excludes minute deviations from the latter, and the frequency has to be above the limit value as determined by the factor of $2f_0$ in the above Equation 3 as minimum.

The firing pulse rate frequency $f_1$ determines, of course, the frequency $f_2$ of the A.C. output voltage. This output frequency equals half the frequency of the firing pulse rate. Hence the inverter output frequency $f_2$ is related to the tank circuit resonance frequency by the formula $$f_2 = \frac{f_0}{1 - \frac{\alpha_1}{\pi}}$$

wherein $\alpha_1$ is the actually effective firing angle and is equal to or larger than the critical angle $\alpha_0$.

In designing a converter, one will mostly start with a particular frequency $f_2$ as being desirable for a specific load. Then one will supplement the load circuit by additional reactances until the resulting resonant circuit has a resonance frequency $f_0$ meeting the above requirements in relation to $f_1$ and $f_2$.

Each individual rectifier element is effectively controlled with the frequency $f_2$ equal to half the pulse rate frequency $f_1$. If the frequency limit given above is being observed, the voltage applied to any conductive semiconductor element in case of firing of the opposite element will be equal to or larger than the voltage necessary to cut the yet conductive rectifier element off.

Furthermore, the period of time corresponding to the actual firing angle $\alpha_1$ will also be equal to or larger than the inherent cut off-delay time of the semiconductor element particularly at high resonance frequencies. The frequency $f_2$ of the effective firing pulse frequency for each individual element (which is equal to the converter output frequency and equal to half the firing pulse rate frequency for the entire assembly) must thus exceed the resonance frequency of the tank circuit by the factor $$1/1 - \frac{\alpha_0}{\pi}$$

with $\alpha_0$ being the larger one of either $\alpha_{01}$ or $\alpha_{02}$ as defined above.

If the firing pulse frequency $f_1$ is increased in relation to the (assumed) constant resonance frequency $f_0$ of the tank circuit, control of the respectively fired semiconductor rectifier elements is determined by the control pulse only. If the resonance frequency $f_0$ of the tank circuit is kept constant and the firing pulse frequency $f_1$ is still further increased, the originally sinusoidal output voltage at low frequencies is deformed towards a triangular shape.

Thus, the firing pulse rate frequency $f_1$ can be within a range having as lower limit a value determined by twice the resonance frequency of the tank circuit as modified by the above factor. The upper frequency limit of the pulse rate frequency is a multiple of the resonance frequency which multiple factor is given by the quotient of a half wave period of the resonance frequency (which is $T/2$) over the time period resulting from the inherent delay of semiconductor element cut off. Thus, there can be written the formula (4) $$2f_0 \times \frac{1}{1 - \frac{\alpha_0}{\pi}} \leq f_1 \leq \frac{2f_0\pi}{\alpha_{02}}$$

wherein $a_0$ is the larger value of $\alpha_{01}$ and $\alpha_{02}$, and $\alpha_{01}$ is determined by the condition of having sufficient voltage across terminals A and B for firing a nonconductive semiconductor rectifier element, whereas $\alpha_{02}$ is the angle corresponding to the delay between initiated and completed cut off in such element (supra). In practice, $\alpha_0 = \alpha_{01}$ at low frequencies of the order of 400 Hz., for example, and is about 15° (degrees electric) whereas for high frequencies (of the order of 5,000 Hz., for example), $\alpha_0 = \alpha_{02}$ and tends to approach a value of 90° electric.

Figure 3:
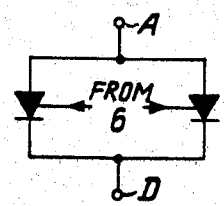
FIGURES 3 and 4 illustrate modifications of the network shown in FIGURE 1.
Figure 4:
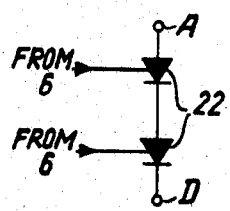

The individual semiconductor rectifier elements such as 11, fore example, can be substituted by several parallel (FIG. 3) or series connected (FIG. 4) similar semiconductor rectifier elements in case the voltage of the D.C. input source and/or in case the load current exceeds that which can be safely handled by an individual semiconductor rectifier element.

R.C.-networks can be provided for protection of individual elements against excess voltages and for suitably dividing the voltage applied thereto.

Rectifier networks of the type described and illustrated can be used in groups to operate in common and in synchronism upon a common tank circuit. Conversely, a single D.C. voltage source can supply several distinct converters, possibly even operating at different output voltage and/or frequency levels.

Figure 5:
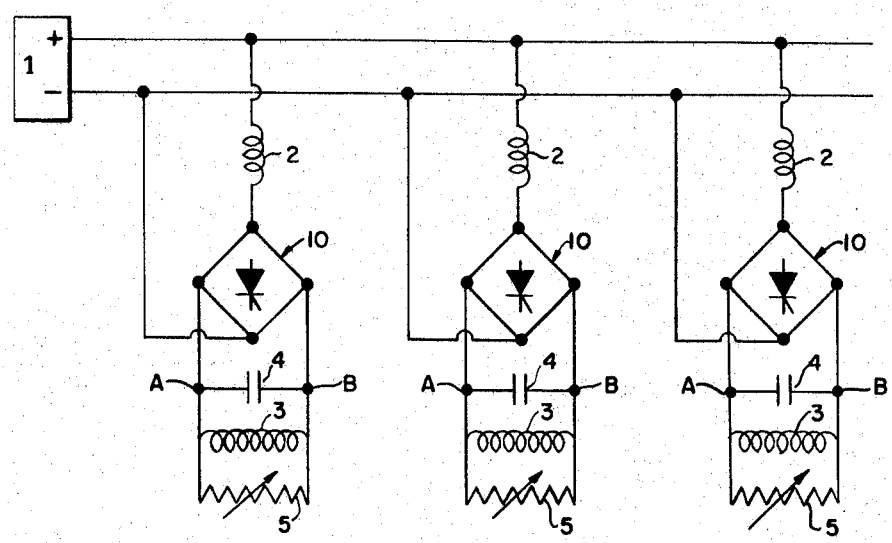
FIGURE 5 is a circuit diagram of another embodiment of the present invention.

FIGURE 5 is a circuit diagram of an embodiment of the present invention in which a single D.C. voltage source 1 supplies several converters each composed of a bridge circuit 10 and a parallel resonant circuit 3, 4 and 5. All of the bridge circuits 10 are connected to a common rectifier 1, each bridge circuit being conected through the intermediary of a separate inductance 2. The circuit is also provided with a plurality of pulse sources 6 (not shown) each of which is identical with the pulse source shown in FIGURE 1 and each of which is connected between a respective parallel resonant circuit and its associated rectifier in the manner illusrtated in FIGURE 1. With this arrangement, it is possible to control each D.C.-A.C. converter independently, and thus to permit each converter to operate at a different frequency and voltage level.

Figure 6:
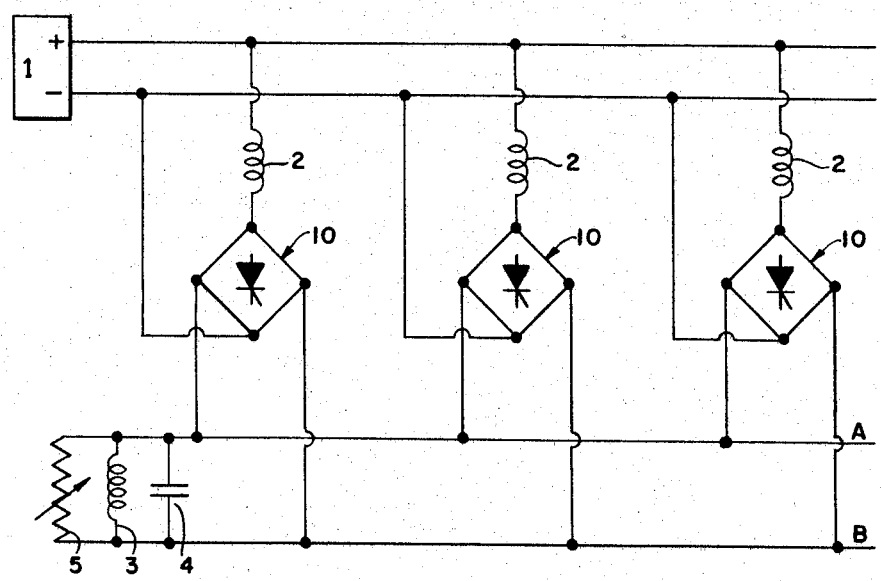
FIGURE 6 is a circuit diagram of yet another embodiment of the present invention.

FIGURE 6 shows an embodiment of the present invention in which a plurality of rectifiers 10 are connected between a common D.C. voltage source 1 and a common tank circuit composed of elements 3, 4 and 5. Each rectifier 10 is connected to the D.C. source 1 through the intermediary of a separate inductance 2 and is connected to the tank circuits 3, 4 and 5. This embodiment also includes a single pulse source 6 (not shown) of the type illustrated in FIGURE 1, which source is coupled to the tank circuit 3, 4 and 5 and has its outputs connected in parallel to rectifiers 10 in such a manner as to control all of the rectifiers in synchronism, the pulse source being connected to each rectifier 10 in the manner illustrated in FIGURE 1. In other words, each output lead of the source 6 is connected to the control terminal of a respective element in each of the bridge rectifiers 10.

The invention is not limited to the embodiments described above but all changes and modifications thereof not constituting departures from the spirit and scope of the invention are intended to be covered by the following claims:

What is claimed is:
1. A D.C. to A.C. converter for producing high frequency outputs, comprising, in combination:

(a) a bridge circuit including four controllable semiconductor rectifier elements and defining two D.C. input terminals and two A.C. output terminals;
(b) an inductance;
(c) rectifier means for supplying a D.C. voltage connected to said D.C. input terminals via said inductance;
(d) output means connected between said A.C. output terminals and including a variable resistance, an inductance, and a capacitance all connected in parallel to form a parallel resonant circuit; and
(e) a control pulse source connected to the control electrodes of said semiconductor rectifier elements for delivering control pulses thereto at a rate greater than twice the resonant frequency of said resonant circuit, whereby each such pulse occurs at least a predetermined time interval prior to the passage of the voltage across said output terminals through zero and the voltage appearing across said output terminals has a frequency which is greater than the resonant frequency of said parallel resonant circuit.

2. An arrangement as defined in claim 1 wherein one portion of said output means defines a load circuit and the remaining portion of said output means defines a resonant oscillatory circuit.

3. An arrangement as defined in claim 1 wherein all of said output means defines a load circuit.

4. An arrangement as defined in claim 1 wherein there are provided a plurality of bridge circuits, inductances, output means and control pulse sources, with each said bridge circuit receiving a D.C. voltage from said rectifier means.

5. An arrangement as defined in claim 1 wherein there are provided a plurality of bridge circuits having their output terminals connected together in parallel across said output means.

References Cited
UNITED STATES PATENTS

| | | | |
|---|---|---|---|
| 2,147,474 | 2/1939 | Wagner et al. | 321—36 |
| 3,222,587 | 12/1965 | Lichowsky | 321—45 |
| 3,229,189 | 1/1966 | Depenbrock | 321—36 |

OTHER REFERENCES

General Electric Silicon Controlled Rectifier Manual, 1961; pp. 77 to 83 relied on.

JOHN F. COUCH, *Primary Examiner.*

W. H. BEHA, JR. *Assistant Examiner.*